(12) United States Patent
Metten et al.

(10) Patent No.: US 11,369,183 B2
(45) Date of Patent: Jun. 28, 2022

(54) CAMERA WITH CALIBRATION DEVICE FOR HAIR ANALYSIS

(71) Applicant: Henkel AG & Co. KGaA, Duesseldorf (DE)

(72) Inventors: Diane Metten, Hamburg (DE); Thorsten Knappe, Schenefeld (DE); Anna Puls, Winsen (DE); Rolf Bayersdoerfer, Hamburg (DE); Katharina Roscher, Hamburg (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 40 days.

(21) Appl. No.: 16/470,942

(22) PCT Filed: Dec. 12, 2017

(86) PCT No.: PCT/EP2017/082323
§ 371 (c)(1),
(2) Date: Jun. 18, 2019

(87) PCT Pub. No.: WO2018/114446
PCT Pub. Date: Jun. 28, 2018

(65) Prior Publication Data
US 2020/0085171 A1 Mar. 19, 2020

(30) Foreign Application Priority Data
Dec. 20, 2016 (DE) ..................... 10 2016 225 656.4

(51) Int. Cl.
*G06K 9/34* (2006.01)
*A45D 44/00* (2006.01)
(Continued)

(52) U.S. Cl.
CPC ............ *A45D 44/005* (2013.01); *G01J 3/463* (2013.01); *A45D 2044/007* (2013.01); *G01J 3/52* (2013.01)

(58) Field of Classification Search
CPC ........... A45D 44/005; G01J 3/463; G01J 3/52
(Continued)

(56) References Cited

U.S. PATENT DOCUMENTS 6,542,259 B1 * 4/2003 Andersen ................. H04N 1/48
  358/1.9
7,489,816 B2 2/2009 Ladjevardi
(Continued)

FOREIGN PATENT DOCUMENTS

DE 102014208206 A1 11/2015
WO 2016193018 A1 12/2016

OTHER PUBLICATIONS

EPO, International Search Report and Written Opinion issued in International Application No. PCT/EP2017/082323, dated Apr. 11, 2018.

*Primary Examiner* — Stephen P Coleman
(74) *Attorney, Agent, or Firm* — Lorenz & Kopf, LLP

(57) ABSTRACT

Calibration devices for calibrating a camera, systems for computer-aided determination of hair colour information, and methods for calibrating a camera are provided herein. In an embodiment, a method for calibrating a camera includes recording a digital image of a piece of calibration information on a fibre from a plurality of fibres from natural hair or fibres that resemble natural hair by employing a camera. The fibre is identified in the digital image by employing a marker. A plurality of colour values are determined for a plurality of reference colours as the calibration information on the fibre in the digital image, wherein a reference colour value is assigned to each reference colour. The respective determined colour value for the plurality of the determined
(Continued)

colour values is assigned to the respectively assigned reference colour value for the plurality of reference colour values.

12 Claims, 5 Drawing Sheets

(51) Int. Cl.
  *G01J 3/46* (2006.01)
  *G01J 3/52* (2006.01)
(58) Field of Classification Search
  USPC .......................................................... 382/164
  See application file for complete search history.

(56) References Cited

U.S. PATENT DOCUMENTS

| | | |
|---|---|---|
| 2008/0260243 A1 | 10/2008 | Occelli |
| 2009/0000348 A1 | 1/2009 | Bonino et al. |
| 2009/0046928 A1* | 2/2009 | Kwak .................... H04N 9/735 382/167 |
| 2010/0208240 A1 | 8/2010 | Schowengerdt et al. |
| 2012/0158019 A1* | 6/2012 | Tenney .................. A61B 34/10 606/133 |
| 2014/0056512 A1* | 2/2014 | Lerios .................... H04N 1/603 382/162 |
| 2014/0118521 A1* | 5/2014 | Conti .................... G01J 3/0264 348/77 |
| 2014/0285806 A1 | 9/2014 | Haas |
| 2014/0313302 A1* | 10/2014 | Franke ................. A45D 44/005 348/77 |
| 2014/0354676 A1* | 12/2014 | Blanc .................... G06T 11/001 345/594 |
| 2014/0368692 A1 | 12/2014 | Luizetto Pinto et al. |
| 2016/0007908 A1* | 1/2016 | Guo ........................ A61B 5/004 348/77 |
| 2016/0011051 A1 | 1/2016 | Conti et al. |
| 2016/0174690 A1 | 6/2016 | Howell et al. |
| 2017/0270679 A1 | 9/2017 | Koven |

\* cited by examiner

CAMERA WITH CALIBRATION DEVICE FOR HAIR ANALYSIS

CROSS-REFERENCE TO RELATED APPLICATION

This application is a U.S. National-Stage entry under 35 U.S.C. § 371 based on International Application No. PCT/EP2017/082323, filed Dec. 12, 2017, which was published under PCT Article 21(2) and which claims priority to German Application No. 10 2016 225 656.4, filed Dec. 20, 2016, which are all hereby incorporated in their entirety by reference.

TECHNICAL FIELD

The present disclosure relates to calibration methods and calibration devices for calibrating a camera, as well as methods and systems for the computer-aided determination of hair colour information.

BACKGROUND

The present disclosure relates to a calibration method and a calibration devices for calibrating a camera, as well as to a method and a system for determining user-based hair colour information.

For people who are concerned with the topic of hair colouring, it is of vital importance to know the colour of someone's own hair prior to the hair colour procedure and the condition of that hair prior to the hair colouring procedure. This information is relevant in order, for example, to be able to specifically select a hair colouring agent or a care product. Users, i.e. people who want to colour their hair or who have already coloured their hair, are often faced with a difficult decision regarding which hair colouring agent is most suitable for their individual hair colour type—they frequently become overwhelmed.

When advising over the telephone as to a hair colour or a hair colouring product, the problem often arises as to how someone's own hair colour can be described to the conversational partner, for example over the telephone. A third person will usually perceive a hair colour described to them in a different and subjective way.

Furthermore, users of hair colouring agents want to know what accessories, for example jewelry or clothing, could best suit a possible new hair colour.

Conventionally, the user selects a hair colouring agent which will, for example, be purchased in a drugstore, according to the target hair colour depicted on the packaging of the hair colouring product. Furthermore, a person may be advised by a hair stylist based on a subjective impression gained by the hair stylist, but the hair stylist and the individual may have very different opinions regarding the hair colour of the individual.

The user could place their hair next to a colour palette accompanying the hair colouring agent prior to the colouring procedure, and thus obtain an initial impression as to what colour their hair will ideally have. Starting out from model hair colours, the colour palette provides an indication as to the target hair colour produced after colouring. In conventional hair colouring products which are on sale, frequently, all of the developer is added to the colouring agent, so that an individual mixing ratio is not an option.

Furthermore, when the user wants to determine their actual hair colour, they must always carry a colour palette with them, i.e. always have to have a frequently unwieldy colour palette with them in order to compare their hair colour with the hair colour reproduced on the colour palette. In this regard, the situation might arise that the user forgets the colour palette or loses the colour palette. Conventional colour palettes often contain a rather coarse categorization of the hair colours, and so the situation might arise that the hair colour of the user cannot be found on the colour palette.

In addition, the shade of the hair perceived by the user could on the one hand be dependent on the current illumination, and on the other hand, this colour impression could not be communicated by the consumer in an objective manner.

The term "colour" as used herein should be understood to mean the interaction of a shade (i.e. a spectral colour impression, also known as the hue, which should be understood to mean what is seen as the "real colour"), a colour intensity (i.e. how intense the colour appears, for example compared with a neutral grey, also described as saturation, colour saturation, colourfulness, chromaticity, or depth of colour) and a brightness (i.e. how light or dark the colour appears).

The term "shade" as used here should be understood to mean the spectral colour impression of a colour, independently of how it may be parameterized, for example as a point in a two-dimensional colour space (for example a*b* in the L*a*b* system) or a ratio of colour percentages (for example in the RGB colour space or in the CMYK colour space).

In addition, self-evaluation of the actual hair colour is not easy for everyone and a considerable proportion of people wrongly assess the shade of their hair, usually lighter than it is in reality. This may, for example, also lead to problems when the user has to insert shade details in an order form to order a hair colouring agent. Thus, when describing hair colours, every person will understand the terms "light brown", "dark brown", "blond", "dark blond" etc. in different ways.

Thus, it can be seen that the treatments coming out of a conventional colour analysis, for example the precise composition of a hair colour mixture, the shade of a decorative cosmetic which is tailored for the hair or the shade of a piece of jewelry or clothing matched to the hair colour, might not be satisfactory to the user because the initial hair colour analysis was defective.

A decision regarding a hair colouring agent could be made easier if an accurate determination of the starting hair colour of the user could be carried out in a rapid and reproducible manner. Furthermore, it would be good if the user did not always have to carry an external colour palette if, for example, their hair colour was being determined at different locations, for example at home, at the hair salon or on vacation. Furthermore, precise information regarding the hair colour would be desirable with a view to optimizing individual blending of the colour mixture, in particular with a view to the type of dye or the quantity thereof.

Thus, there is a need for a method and a system which provides rapid, reliable and low-cost determination of an exact starting hair colour. The precise information regarding the starting hair colour provided by the method or system can then form the basis of a multitude of information tailored to the user as regards their desired target hair colour.

In addition, other objects, desirable features and characteristics will become apparent from the subsequent summary and detailed description, and the appended claims, taken in conjunction with the accompanying drawings and this background.

BRIEF SUMMARY

Calibration devices for calibrating a camera, systems for computer-aided determination of hair colour information using the calibration devices, and methods for calibrating a camera are provided herein. In an embodiment, a method for calibrating a camera includes recording a digital image of at least one piece of calibration information on at least one fibre from a plurality of fibres from natural hair or fibres that resemble natural hair by employing a camera. The at least one fibre is identified in the digital image by employing at least one marker. A plurality of colour values are determined for a plurality of reference colours as the calibration information on the at least one fibre in the digital image, wherein a reference colour value is assigned to each reference colour. The respective determined colour value for the plurality of the determined colour values is assigned to the respectively assigned reference colour value for the plurality of reference colour values.

BRIEF DESCRIPTION OF THE DRAWINGS

The present disclosure will hereinafter be described in conjunction with the following drawing figures, wherein like numerals denote like elements, and:

FIGS. 3-1 to 3-2 show a flow chart which represents a method for determining hair information in accordance with various exemplary embodiments;

DETAILED DESCRIPTION

Figure 1:
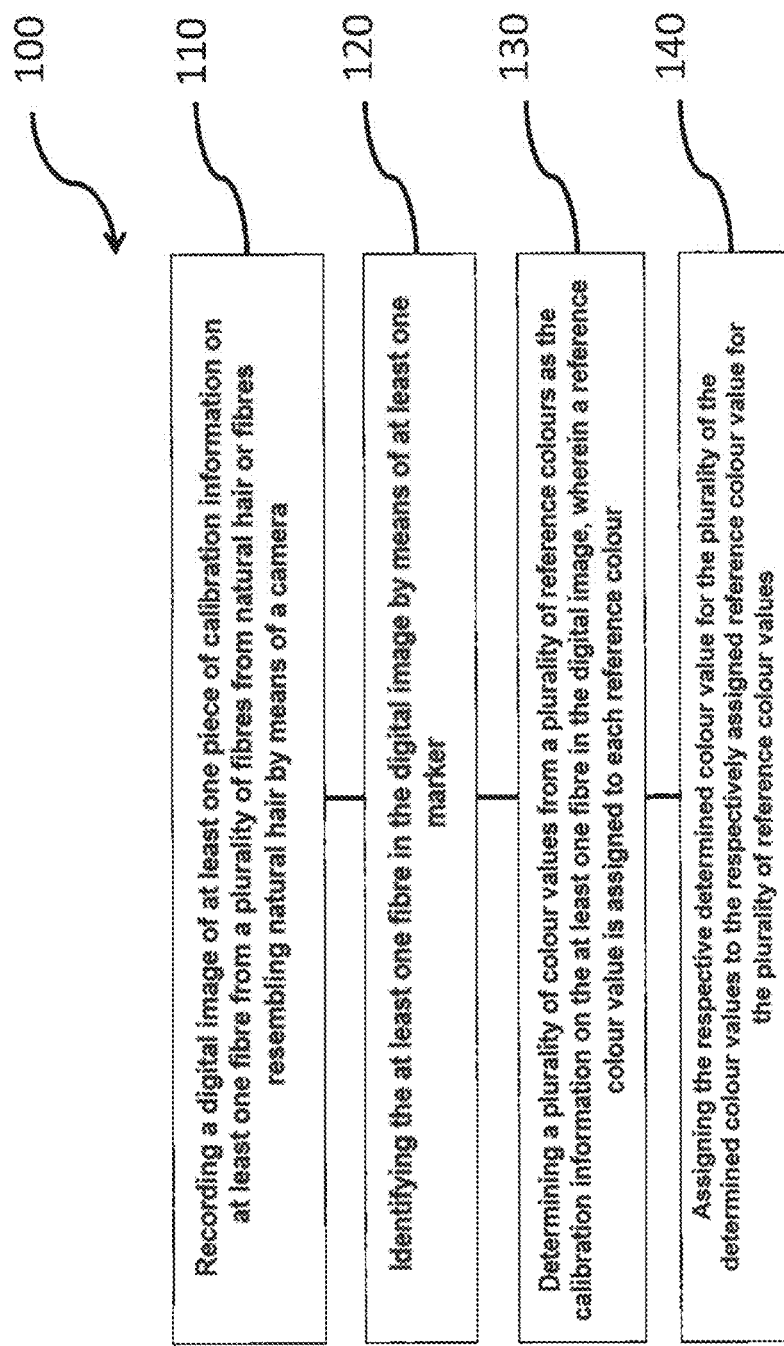
FIG. 1 shows a flow chart which represents a method for calibrating a camera in accordance with various exemplary embodiments.

The following detailed description is merely exemplary in nature and is not intended to limit the disclosure or the application and uses of the subject matter as described herein. Furthermore, there is no intention to be bound by any theory presented in the preceding background or the following detailed description.

In various exemplary embodiments, a method is provided by employing which an actual hair colour can be identified objectively rather than subjectively. In particular, a precise determination of the actual hair colour is desired, by employing which the influence of the lighting conditions at the time of the measurement of a hair colour of a user can be minimized.

In various exemplary embodiments, a degree of damage to user's hair can be determined.

In various exemplary embodiments, in addition to the exact identification of the hair colour, a percentage of grey in the hair may be captured by employing a camera.

In various exemplary embodiments, after determining the exact hair colour of the user, user-based information may be provided in order to obtain a better hair colour result and thus to increase user satisfaction.

In various exemplary embodiments, after determining the exact hair colour, information may be presented to the user which advises them as to the choice of accessories such as, for example, jewelry or clothing which match the hair colour.

The respective features of the independent claims can also accomplish what has been described above. Further advantageous exemplary embodiments may be obtained from the dependent claims and the description of the embodiments below.

In various exemplary embodiments, a method for calibrating a camera may be provided, which comprises recording a digital image of at least one piece of calibration information on at least one fibre from a plurality of fibres from natural hair or fibres that resemble natural hair by employing a camera, identifying the at least one fibre in the digital image by employing at least one marker, determining a plurality of colour values for a plurality of reference colours as the calibration information on the at least one fibre in the digital image, wherein a reference colour value is assigned to each reference colour, and assigning the respective determined colour value for the plurality of the determined colour values to the respectively assigned reference colour value for the plurality of reference colour values.

In various exemplary embodiments, advantageously, the disruptive factor regarding the dependency of the lighting conditions at the time of recording a digital image of hair can be minimized. The problem arises that when determining a hair colour of a user, hair is assessed differently as a function of the relevant lighting conditions, because the hair colour can vary as a function of the lighting conditions prevailing at the time of recording.

A calibration method is provided by employing which it is possible to adjust a camera to specific reference colour values. The camera can capture colours from reference structures on a calibration device. A reference structure on a calibration device may have a plurality of reference colours to which respective reference colour values can be assigned. After measuring the hair colour of a user by employing the camera, the determined hair colour value can be linked to a determined reference colour. The associated reference colour value for the reference colour can subsequently be determined. In this manner, by selecting the reference colour value associated with a reference colour, the actual hair colour of a user can be determined substantially without the actual lighting conditions having an influence.

In detail, by employing the camera, as an example, a first colour value 1 for a reference colour 1 may be recorded on the calibration device, a second colour value 2 for a second reference colour 2 may be recorded on the calibration device and a third colour value 3 for a third reference colour 3 may be recorded on the calibration device, and these three colour values 1, 2, 3, may be stored, for example. Because it is known that a specific colour reference value 1 has been assigned to the colour value 1, that a specific colour reference value 2 has been assigned to the colour value 2, and that a specific colour reference value 3 has been assigned to the colour value 3, a difference in the colour value can be determined in each case and stored as a value. This could also be said to be a transformation of a colour value into an associated reference colour value. By employing the calibration method, the lighting conditions prevailing at the time the digital image is recorded can be said to have been taken out of the equation. Expressed another way, the colour values captured by the camera are corrected by employing the reference colours and the associated reference colour values.

After carrying out the calibration method, a colour value 4 recorded by employing the camera can subsequently be compared with the stored colour values 1, 2 and 3 for the reference colours. If, for example, a colour value 3 for a reference colour is determined which has a predetermined colour difference or has a minimum colour difference with respect to the colour value 4, then the reference colour value assigned to the colour value 3 can be assigned to the colour value 4.

In various exemplary embodiments, the calibration method may be carried out with only one reference colour on the calibration device and an associated reference colour value. In various exemplary embodiments, a plurality of reference colours and a plurality of respectively associated reference colour values may be employed. The use of a plurality of reference colours has the advantage that a plurality of calibrated colour values may be provided in the colour spectrum which is relevant for the determination of a hair colour value.

It may be envisaged that during the course of the calibration method, recording the calibration structure, i.e. the fibre and the reference colours on the fibre, may be carried out repeatedly or a plurality of times. By employing the camera, images of the calibration device may be recorded continuously. This has the advantage that the determination of the reference colours may be carried out in an optimized manner because, for example, after determining a reference colour by employing the camera three times one after the other, a mean of the three determined colour values may be constructed. In various exemplary embodiments, further methods may be provided which determine the most appropriate colour values from a plurality of measured colour values.

Furthermore, in one embodiment of the calibration device in the form of at least one fibre or a strand of hair, i.e. a plurality of fibres or individual fibres, the calibration method takes not only the influence of the lighting conditions on the measurement result into account but also takes the influence of the surface properties (keratinous fibres) on the measurement result into account. A "plurality of fibres" may be described herein as strands, hair strands, reference hair strands, zero strands or 0 strands.

A degree of damage to the hair may be determined by using a calibration device which comprises at least one fibre. On the software level, in the digital image a surface quality of the natural hair fibres of the user or a hair strand of the user may be compared with the surface quality of the at least one fibre or strand of the calibration device. In various exemplary embodiments, by employing a comparison of the user's hair structure with the at least one fibre of the calibration device, degrees of damage to the hair which may occur, for example, because of mechanical influences such as combing, backcombing, the use of hair curlers etc., may be determined. Furthermore, in various exemplary embodiments, the influences of heat on the hair, for example from curling tongs etc., may be determined. As a function of the degree of damage to the user's hair, the user could, for example be provided with advice on an output device concerning a conditioning agent tailored to the degree of damage or an agent for better and long-lasting colour results.

Furthermore, applying the reference colours to the at least one fibre means that a very small calibration instrument is provided which can be carried unobtrusively in or on the hair of the user. In this manner, the at least one marker may have any form, for example a square surface, a rectangular surface or a circular surface, but may also be in the form of a barcode or QR code.

In the method, a camera, for example the camera of a smartphone or a tablet or a webcam, may be directed onto the user themselves or onto another person in a manner such that a digital image of the calibration information on the calibration device can be recorded. To express this another way, the user or a further person who wishes to record the calibration device or the at least one fibre with the camera positions the camera over the calibration device/at least one fibre in a manner such that the calibration device is represented in the digital image. Thus, at least one fibre which can provide the calibration information can be represented in the digital image. Furthermore, a strand which includes a plurality of fibres and which may comprise calibration information, may also be represented.

In various exemplary embodiments, the identification of the at least one fibre in the digital image by employing at least one marker may comprise an identification of an unnatural colour profile within the at least one fibre and/or of a characteristic shade on the at least one fibre in the digital image.

In various exemplary embodiments, the colour information may, for example, comprise a parameterization in a known colour space, for example in a L*a*b* colour space (wherein L* gives the brightness of a colour, a* gives the percentage green and red and b* gives the percentage blue and yellow of the colour), in a RGB colour space by employing red, green and blue colour percentages, in a CMYK colour space using cyan, magenta, yellow and black colour percentages, or in any other colour space, for example the CIELUV colour space system or /1/2/3/.

In various exemplary embodiments, a colour space from which the colour information derives (hair colour information and image colour information) may be generated in a manner such that a determined or represented colour is independent of a medium through which the colour is determined or represented (for example screen, printer, scanner, human eye, etc.). The colour space may, for example, be a L*a*b* colour space, and the colour information may, for example, be a shade parameterized by a* and b*. The unique representation in a medium-independent colour space means that a colour result can be presented that is close to reality.

In various exemplary embodiments, advantageously, during the calibration method, the calibration device can be identified by employing at least one marker in the digital image and by employing an image analysis. The calibration device can be distinguished from other objects by employing the at least one marker, for example, such as the user's hair or regions of skin on the forehead and ears in the recorded digital image.

An unnatural hair profile, for example a region in which black or white sub-regions alternate to distinguish the calibration device, or coloured regions alternate, may advantageously be used in this regard in order to distinguish the calibration device in the digital image by employing image analysis. In various exemplary embodiments, patterns may be provided on the calibration device which may be visible or invisible to the human eye and which differ in their structure from the natural structure of hairs. Furthermore, in various exemplary embodiments, the at least one fibre may have a variable diameter.

As an example, at least two unnatural colour profiles may be present on the calibration device in the digital image. The position of, for example, two unnatural colour profiles or at least one characteristic shade may be identified, for example by employing an image analysis, or be identified in the digital image on the software level. As an example, image analysis software may be used to determine that the reference colours are positioned between the identified unnatural colour profiles or the characteristic shades. A further investigation of the digital image could then, for example, be restricted to the region between the unnatural colour profiles or, for example, between two characteristic shades in which the reference colours may be represented. A characteristic shade may, for example, be at least one neon tone or a grey level in otherwise non-grey hair.

In various exemplary embodiments, the determination of the plurality of colour values in the digital image may comprise identifying a plurality of reference regions in which the reference colours are provided, by employing at least one further marker.

In various exemplary embodiments, in an advantageous manner, the reference colours, which may be within reference regions which may be exemplified by at least one marker, for example, may be rendered easier or optimized in the digital image for the software. A plurality of markers may, for example, enable a position of the calibration device to be identified in the image. In various exemplary embodiments, furthermore, each reference region into which a specific reference colour may be introduced may be provided with at least one marker, wherein the respective marker can precisely characterize the reference region assigned to it.

In various exemplary embodiments, at least one reference region in which a reference colour is represented may be labelled by employing three or four markers at the corners of the reference regions. The arrangement of the markers then means that a position of a reference colour can be obtained and an assignment of the reference colours to reference colour values may be made. In various exemplary embodiments, each possible positioning of markers may be provided in or around one of the plurality of reference regions.

If the respective markers are now detected in the digital image, then information regarding the position of the respective reference colours, for example between the markers, over the marker, to the left or right of the marker, may be obtained. On the software level, for example, a colour value for each reference colour may then be determined.

Furthermore, in various exemplary embodiments, the at least one marker may itself carry information which has at least one detail regarding a reference colour value to which a respective reference colour can be assigned.

In various exemplary embodiments, a method may be provided in which when identifying the at least one fibre in the digital image and/or when determining a plurality of colour values for a plurality of reference colours, markers with colour values are used which have a colour spectrum in a wavelength range of from about 10 nanometres to about 1 millimetre, preferably in a wavelength range of from about 380 nanometres to about 780 nanometres, or preferably in a wavelength range of from about 10 nanometres to about 380 nanometres or in a wavelength range of from about 780 nanometres to about 1 millimetre.

In accordance with the present disclosure, advantageously, a simpler way may be generated by using at least one marker which is visible to the eye, so that the calibration device is detected by the human eye and, for example, can be differentiated from the natural hair of the user. The user or another person can see the calibration device on the head of a user and accordingly, the camera can be directed onto the calibration device in a simple manner.

Invisible markers may have the advantage that the calibration device is not highlighted compared with the remaining hair of the user, i.e. the user will not be perturbed by noticing it in the hair.

In various exemplary embodiments, a method may be provided in which the detection of the at least one marker is carried out by employing at least one optical method.

In various exemplary embodiments, the at least one marker may be detected in the digital image by employing a software level image analysis method. In order to allow large images to be processed, it might be advisable to divide the digital image into individual sub-images (image segments). Individual image parts may explicitly be assigned to an object, for example the calibration device or a region of the hair, without having to process the remaining image further. This can result in a huge reduction in the data used for further computations. An image may be segmented using very different methods, for example in accordance with segmentation according to colour, segmentation according to texture, or finding regions within a closed contour.

As an example, by employing a clustering method, regions in the digital image recorded with the camera can be detected. In clustering, initially, two centres in the digital image are randomly selected; one is a central point with class 1, and the other is a central point with class 2. Next, areas with identical properties around these centres are searched for and added to the respective class. Areas are formed in the digital image. Depending on the task in hand, further centres may be incorporated, so that in the end, coherent areas with the same properties form a class.

By employing the amplitude projection method, regions can be detected in the digital image, for example. If specific features of an image are known, for example an unnatural or atypical colour profile on the calibration device, then often, a relatively simple method, segmentation, can be employed. If, for example, the input image contains only one standout region distinguished by its colour value, which has to be found, then amplitude projection is possible. A value is calculated per row and column of a digital image recorded with the camera which provides the mean value for the grey levels of this one line or column. If, for example, it is known that the searched region in the digital image is the only dark region, then the digital image can be trimmed by selecting all lines or columns for which the value exceeds a specific threshold value and the remainder can be hidden.

As an example, in various exemplary embodiments, for a reference colour on the calibration device which is matched to a starting hair colour of a user with light blond hair, markers may be used which have black or dark colour values. Because of the larger difference in colour or contrast between the colour of the light hair and the dark markers, the dark markers can be distinguished from the light hairs in the digital image during a digital image analysis in an optimized manner.

As an example, in various exemplary embodiments, for a reference colour on the calibration device which is matched to a starting hair colour of a user with brown or dark hair, markers may be used which have white or light colour values. Here again, because of the larger colour difference between the colour of the dark hair and the light or white markers, the light markers can be distinguished from the dark hairs in the digital image during a digital image analysis in an optimized manner.

In various exemplary embodiments, in the digital image, contour tracing may be of assistance in order to separate regions in the digital image by employing polygonal lines. Instead of assigning a digital image area of its object to each pixel, encircling is carried out with the aid of a coordinates list. During contour tracing, in particular the steps of finding contours, contour linking and contour approximation may be carried out. What is known as a bug follower may be used to find contours. A bug follower moves over the pixels of the digital image in accordance with an algorithm and investigates the contour until it returns to its starting point.

Contour chaining may in particular be used when lines in the digital image are interrupted by external influences. Local or global operators detect whether, for example, a line can be taken further, or noise or an error can be accommodated. Subsequently, the contour can be approximated by a function, also known as a contour approximation. By employing this further step, even later evaluation is made possible, because the functions are much better for analysis or comparison than sequences of points.

During image analysis of the digital image, a processor may be in a position to be able to identify the position or the coordinates of the marker in the digital image and from it, for example, to determine where in the image the calibration device or, for example, reference colours are disposed on the calibration device in the digital image. The positions of the reference colours on the calibration device may be determined and the colour values of those pixels in the digital image which are present in the predetermined position in the digital image may be determined.

In particular, segmentation and feature extraction may be of application. In particular, the methods of thresholding and region growing, which are used for the segmentation of digital images, may be employed. During a verification extraction from digital images, what is known as the Canny edge detector and/or what is known as the Harris corner detector may be used. For the segmentation of images, three major groups of segmentation methods are available: threshold-based, edge-based and region-based segmentation. As an example, threshold-based segmentation, also known as thresholding, operates with one or more static or dynamic thresholds. Thresholding is the use of a threshold on a grey image. A non-linear function converts the recorded image into a binary digital image in which each pixel is coloured either white or black, depending on whether the investigated pixel value is above or below a defined threshold value.

Furthermore, the region growing method may be used for the identification of identical image regions. Starting from a starting pixel, adjacent pixels are tested as to whether they exhibit an equality so that they can be included into the region. If this is not the case, they are discarded as being outside. In order to obtain meaningful regions, seed points have to be selected. The region growing algorithm requires that the object to be searched in the digital image must be sufficiently different from the background, for example a reference colour on the calibration device. Thus, it is necessary to look for specific features in digital images which correlate with objects. In this regard, edge detectors are particularly suitable, because edges are prominent features of an image. A map usually sets the end of an object, for example an edge of a reference colour or an edge of a marker. However, an edge may also occur in other circumstances. Furthermore, a map may be exemplified by a difference in intensity, for example a difference in colour intensity of a reference colour with respect to its environment.

Suitable edge detectors operate in three essential steps: a mask is used on the digital image in order to produce gradients of intensity. Distinctive gradients are selected by thresholding over the gradient image. Next, the computed data are linked by employing operators and algorithms to form edges, for example the edges of a reference colour.

As an example, in various embodiments, at least one position of an edge of an unnatural colour profile on the calibration device may be determined. Furthermore, in various embodiments, a position for reference colour regions may be determined on the calibration device in the digital image.

In addition to the edge detectors, however, corner detectors may also be used. Two edges end in a corner which in turn represents a termination of an object, for example a termination of a reference colour or a marker and for which its coordinates in the digital image can be identified. Corners may, for example, be identified by employing gradients or with the aid of morphologies in the digital image. One aim of morphological image processing may on the one hand be a new image which highlights what is relevant. A further aim may be to produce a list which is filled with parameters determined from the digital image. As an example, in various embodiments, at least one position of a corner of an unnatural colour profile may be detected on the calibration device. Furthermore, in various embodiments, a position of at least one corner of at least one reference colour region in which the reference colour is positioned may be determined on the calibration device in the digital image.

In various embodiments, objects such as, for example, an unnatural colour profile on the calibration device or a region which has a characteristic colour, may be detected in the digital image by employing template matching. Template matching belongs to model-based segmentation. In template matching, by employing a complete search, it is decided how good a model (template) which is provided matches a specific pixel region. The model describes as accurately as possible the object to be searched, for example a fibre, a colour field or a marker, and how it is embedded in the environment. In this respect, the object template is bounded by a bounding box at a distance of one pixel. More surroundings than necessary would merely increase the error rate. The template should as far as possible have the same size and orientation as the object in the digital image to be detected. As an example, a template of an unnatural colour profile of a hair and/or a fibre and/or a hair strand and/or a marker and/or a colour field etc. may be generated which is known to the algorithm which is running on the processor. This template can then be detected in the digital image by employing a processor at least once and also the position of the template in the digital image may be determined. If, for example, the template and its orientation, for example a marker, is detected twice in the digital image, then, for example, the region between the determined positions on which the template is found, for example a colour field, may, for example, be included for further investigation of the digital image in accordance with the colour of the colour field. In the region between the detected templates in the digital image, the at least one colour reference field may be provided with the reference colour.

Furthermore, further information, for example in the form of a coding code, may be applied to the calibration device which can be read using a decoding device, for example a camera. As an example, a barcode or a QR code may be used to define the reference colour value of the reference colour fields. By employing the QR code, each reference colour on the calibration device may be assigned a unique number which can then by identified using the camera. Thus, for example, the reference colours can be assigned an RGB colour value in the RGB colour space or a CMYK colour value in the CMYK colour space. Thus, for example, a first reference colour may be assigned a reference colour value "dark brown", a second reference colour may be assigned a reference colour value "mid brown" and a third reference colour on the calibration device may be assigned a reference colour value "light brown", or a first reference colour on the calibration device may be assigned a reference colour value "white", a second reference colour may be assigned a reference colour value "yellow" and a third reference colour on the calibration device may be assigned a reference colour value "golden".

In various embodiments, a method may be provided in which the assignment of the plurality of colour values determined in the digital image to the reference colour values may comprise storing the determined colour values for the associated reference colour values in a memory.

Advantageously, in each case a pair of data sets is present which may each be stored together in a memory. If the reference colour value is determined for a reference colour, then this can be obtained by outputting the reference colour value associated with the reference colour.

In various embodiments, a method may be provided in which the reference colours in the digital image are determined on the basis of a different colour stimulus specification and/or a different spectral composition and/or a different brightness.

The colour stimulus specification of a light beam is a physiological parameter which describes the action of the light beam on the colour-sensitive sensory cells of the human eye. In contrast to the spectral distribution, i.e. the complete information regarding the spectral colours present in the light beam, the colour stimulus specification is restricted to the less comprehensive information represented by the three numerical values which trigger colour perception of the light beam in the eye.

As an example, differences in the reference colours may easily be determined by a difference in brightness of the colours.

In various embodiments, a method may be provided in which recording a digital image of at least one piece of calibration information may comprise recording a fibre which is semi-permanently coupled to the hair of a user in the form of a hair extension or in the form of a weave of the fibre into the hair of the user. The term "hair extension" or "extension" may be used for the term "hair extension".

In various embodiments, a method may be provided in which recording of a digital image of at least one piece of calibration information comprises recording a fibre which is permanently coupled to the scalp of the user by employing implantation.

By employing the semi-permanent or permanent attachment of the calibration device to the hair of the user, the calibration method can be carried out at any time and in any location, because the calibration device can be permanently carried on the body. The use of a semi-permanent or permanently fixed calibration device frees the user from the need to use an additional external calibration device, and means that the hair colour can be determined anytime and anywhere.

Furthermore, the calibration device may be attached to the hair of the user with a clip or a hair elastic.

In various embodiments, a method may be provided wherein recording a digital image of at least one piece of calibration information is carried out by employing a camera of a smartphone or a tablet.

Carrying out the calibration method on a smartphone or a tablet device that the calibration method is independent of location, i.e. can be carried out while travelling. As an example, a calibration of the camera may be carried out while travelling under different lighting conditions at home, at the hair stylists, at a point of sale for hair treatment agents, or on vacation.

In various embodiments, a method may be provided wherein the calibration information, preferably the reference colours, are provided in a manner such that they are matched to a starting shade of the hair of the user.

This may be advantageous when, during the calibration of the camera, colour values are used for which the colour values are close to the hair colour value for the hair of the user. The camera may already be calibrated in a colour region in which, for example, the hair colour value of the hair of a user falls within the range of a possible later hair colour determination of a user. This can lead to an optimization of the method for determining an actual hair colour of a user in respect of the execution time for the method.

In various embodiments, a method for the computer-aided determination of hair colour information may be provided, which comprises carrying out a method for the calibration of a camera in accordance with various exemplary embodiments, and furthermore determining a hair colour value for hair of a user in the digital image, determining that determined colour value which has a difference in colour to the determined hair colour value such that it satisfies a predetermined difference criterion, providing the reference colour value assigned to the determined colour value as the actual hair colour value, determining a target hair colour value, determining a data set based on the actual hair colour value and on the target hair colour value, providing at least one piece of information which is relevant to the user based on the data set.

By employing the method, in an advantageous manner, the actual hair colour of the user may be determined based on a calibration method for the camera, in a simple and accurate manner. The actual hair colour can be determined exactly, because the camera has already been calibrated prior to carrying out the hair colour determination for the user. With the method for computer-aided determination of hair information, a colour value determined in the digital image of the hair of the user can be compared with a colour value which has been calibrated by employing a plurality of reference colours. In this manner, in a simple manner, a genuine hair colour value can be assigned to the determined hair colour value.

The information which is relevant to the user may be a product recommendation, preferably regarding a hair colouring agent, a hair treatment recommendation, preferably regarding the treatment time for a hair colouring agent, a mixing ratio for colour and developer or a conditioning treatment, or a colour recommendation, preferably regarding a decorative cosmetic or a piece of jewelry or clothing.

In various embodiments, a method may be provided in which the determination of a hair colour value comprises determining a hair colour value in a hair region area in the digital image.

The determination of the hair region area in the digital image may, for example, be carried out when only a single digital image is recorded with the camera, in which the calibration device and the hair of the user and other objects, for example, are represented. As a consequence, the calibration device as well as the hair of the user must be identified. Thus, the method advantageously envisages determining a hair region area in the digital image in which the hair is represented in the digital image.

A hair region area may, for example, be identified in a digital image by identifying a frequency distribution of colour values of individual image points of the digital image. A sub-group of image points, for example a group of image points which lie in a colour space close to a given colour value, may be assigned to the hair region area.

Furthermore, a spatial proximity and/or a linear progression of image points with the same or similar colour may be used in order to determine a hair region area, for example in particular parts of the hair such as, for example, a fibre or a hair strand which cannot be represented as a closed surface.

When determining a hair region area, statistics for frequent hair colours may be used in order to determine a selection zone in a colour space in which image points of a digital image can be assigned to a hair region such that all or essentially all of the hair, for example hair of the head or, for example eyebrows, eyelashes or beard etc., can be assigned to this hair region in a digital image. On the other hand, a region which depicts no hair or essentially no hair will not be assigned to the hair region.

When determining a hair region area, statistics for frequent hair colours may be used wherein, for a plurality of hair colours which frequently occur in human hair, a typical frequency distribution can be respectively determined for at least one piece of colour information.

The colour information may, for example, be colour information which is parameterized in a colour space. As an example, the colour information may be parameterized by employing a plurality of parameters in a manner such that a colour can be uniquely identified by employing a plurality of parameters. Thus, in various exemplary embodiments, the colour information may, for example, comprise parameterization in a known colour space, for example in a L*a*b* colour space, wherein L* is the brightness of a colour, a* the percentage green and red and b* the percentage blue and yellow of the colour in an RGB colour space. Furthermore, a CMYK colour space may also be used. The term "digital image" as used herein should be understood to mean a data packet which can be represented by a data processing system as a two dimensional (flat surface) arrangement of image points, for example in a coordinate system which has an x axis and a y axis, wherein each image point is associated with at least one piece of colour information, which, for example, can be represented as a colour of a pixel on a monitor or a printed point of a printed image. In this regard, the digital image may, for example, be a photograph recorded using a digital camera or an individual image of a video sequence recorded with a digital camera (wherein in various embodiments the method can then, for example, be applied to a plurality of individual images of the video sequence).

In various embodiments, a method may be provided in which the determination of the target colour value comprises determining the target hair colour value using an input device, preferably by employing a keyboard or by employing a touch-sensitive screen of a smartphone or tablet.

The target colour may be selected by the user in a simple manner, for example by selecting a target hair colour value from a plurality of target hair colour values presented to the user by actuating, for example at least one mechanical key of the input device or a key provided in the touch-sensitive screen of the smartphone or of the tablet.

In various embodiments, a method may be provided in which the determination of the target hair colour value comprises selecting the target hair colour value from a plurality of selectable stored target hair colour values.

In various embodiments, a method may be provided in which the determination of a data set based on the actual hair colour value and on the target hair colour value is carried out using the camera, or the determination of a data set based on the actual hair colour value and on the target hair colour value is carried out by employing an external platform.

The determination of a data set based on the actual hair colour value and on the target hair colour value may be carried out by employing the camera itself in which, for example, the data set is provided in at least one memory of the camera. This has the advantage that, even when the data connection is interrupted between the camera, for example the camera of a smartphone or tablet, an exchange of data between the locally stored data can be carried out at a high speed.

A data set based on the actual hair colour value and on the target hair colour value which is provided on an external platform, for example on a server or on a centrally disposed computer, has the advantage that several users can access the external platform at the same time. Storing the data concerning the hair colour value which has been determined and the target hair colour value on an external platform, for example in a database on a server, has the advantage that the hair colour values can be stored in a user-dependent manner and can be used again for statistical evaluations. In addition, the external database can be accessed from different locations and using a plurality of systems for determining hair information.

In various embodiments, a method may be provided in which the method is carried out using a mobile application.

In various embodiments, a method may be provided in which the provision of at least one piece of information comprises a written and/or graphical presentation on an output device, preferably a screen or a smartphone or a tablet. Alternatively, the at least one piece of information may be provided using a voice output.

By employing written and/or graphical presentation of information based on the data set, advantageously, the information can be presented in a manner which can be accessed by the user in a clear and easy manner.

In various embodiments, a method may be provided in which a result of a colour balance of the actual hair colour value with a target hair colour value selected by employing an input device is presented to the user by employing the output device as x % colour match or as x % colour harmony.

Thus, the user can be presented, in a clear and advantageous manner, with a link between the hair colour value or shade of the actual hair colour and the colour value or shade of the target hair colour. Furthermore, it is possible to present the result of the colour balance in an appropriate graph.

In various embodiments, a calibration device for calibrating a camera may be provided, which comprises at least one fibre from a plurality of natural hair fibres or from fibres that are similar to natural hair, a plurality of different reference colour structures which are attached to the at least one fibre, and at least one marker to detect the at least one fibre in a digital image.

The calibration device may, for example, be produced from real hair from a human being, a horse, a cow, a sheep or other, different animals. Furthermore, the at least one fibre may be provided as an artificially produced fibre or as an artificially produced strand, in other words as artificial hair. The reference colours may be applied to the at least one fibre or to a plurality of fibres, i.e. to a strand.

The at least one marker may act to precisely identify an object, for example in a digital image.

The at least one marker may be produced as a punctiform marker, as a marker in a form similar to a square, as a marker in a form similar to a rectangle or as a marker in a form similar to a triangle. In various embodiments, any other forms of markers may be used, even those which may comprise further information. In particular, markers may be provided which, in addition to their position, also could comprise colour value information. Thus, a marker may be configured in a manner such that, because of its form or shape, it comprises information regarding a colour value, for example a colour value of a reference colour on the calibration device. This may, for example, be produced by employing a barcode-like marker or a QR code-like marker, wherein the information stored by employing the marker may be a hexadecimal code in the hexadecimal system which can be assigned to a colour.

In addition, further information may be provided on the calibration device by employing a RFID (radio frequency identification) or an NFC (near field communication) chip.

In various embodiments, a calibration device to calibrate a camera may be provided, wherein the at least one marker has an unnatural colour profile or at least one characteristic shade.

A marker which has an unnatural colour profile or a characteristic shade has to be distinguished more reliably from natural hair colours or other objects during an analysis of a digital image and captured more reliably. An unnatural colour profile may, for example, be a successive sequence of repetitive grayscale values or colour values which can be captured using the camera.

In various embodiments, a calibration device for calibrating a camera may be provided, wherein the at least one marker comprises colour values which lie in a colour spectrum in a wavelength range of from about 10 nanometres to about 1 millimetre, preferably in a wavelength range of from about 380 nanometres to about 780 nanometres, or preferably in a wavelength range of from about 10 nanometres to about 380 nanometres or in a wavelength range of from about 780 nanometres to about 1 millimetre.

A marker that is visible to the eye has the advantage that the calibration device can be seen by the human eye and the camera can be positioned on the calibration device with the at least one marker. A marker that is invisible to the eye has the advantage that the at least one marker cannot be seen by the human eye, but, for example, can be detected by a technical device. Thus, the marker can be located optically unobtrusively in the hair.

In various embodiments, a calibration device may be provided to calibrate a camera, wherein the calibration device comprises at least one further marker on the calibration device, wherein by employing the at least one further marker, at least one of the plurality of reference colour structures may be detected on the calibration device in a digital image.

The at least one marker may be provided in order to make a position of a reference colour in the digital image detectable, for example. The use of at least one marker for the localization of at least one reference colour in the digital image has the advantage that, when determining the colour value of a reference colour in the digital image, those pixels of a plurality of pixels in the digital image are detected which lie in a region in the digital image determined by the at least one marker. The use of at least one marker in the determination of colour values constitutes an optimized determination method.

In various embodiments, a calibration device for calibrating a camera may be provided, wherein the plurality of reference colour structures differs in a colour stimulus specification and/or a spectral composition and/or a brightness.

As an example, differences from reference colours may easily be detected by a difference in brightness of the colours.

In various embodiments, a calibration device for calibrating a camera may be provided, wherein the reference colour structures may be matched to a starting colour value for hair of a user.

This may be advantageous, because even when calibrating the camera, colour values are used the colour values of which are close to a hair colour value of the hair of the user. The camera may already be calibrated in a colour region in which, for example, the hair colour value for the hair from a user lies, for possible later hair colour determination. This can lead to an optimization of the method for determining an actual hair colour of a user.

In various embodiments, a calibration device for calibrating a camera may be provided, wherein the calibration device is semi-permanently provided as a hair extension or by employing weaving the calibration device into the hair of a user, or is permanently provided by implantation of the calibration device into the scalp of the user.

Because the calibration device is semi-permanently or permanently attached to the hair of the user, the calibration method can be carried out at any time and at any location. The use of a semi-permanently or permanently fastened calibration device can free the user from the necessity of adding an additional external calibration device and permits the hair colour to be evaluated anytime and anywhere.

In various embodiments, a system for computer-aided determination of hair colour information may be provided, wherein the system comprises the calibration device described above, a camera to record a digital image of the calibration device and/or of hair of a user; a processor to identify the calibration device and/or colour values in the digital image, an input device to select a target hair colour value, and an output device for providing information regarding at least one hair colour value.

The camera may be a high resolution digital camera (HD camera or high definition camera). The camera may be an ultra HD camera and have a resolution of 4K (4096×2160). Furthermore, the camera may have a resolution of 8K (7680×4320). In particular, the camera may be provided to record small structures at a high resolution.

The processor may be a central processing unit or CPU or a microcontroller which executes a process or algorithm or a program. As an example, the processor may be formed in a computer, a smartphone or a tablet.

The input device may be a keyboard of a computer, a smartphone or a tablet. The input device may be produced as a touch-sensitive screen or touchscreen, for example of an output device.

The output device may be a screen, for example of a smartphone or tablet.

In various embodiments, a system may be provided in which the camera is a colour camera of a smartphone or a tablet.

In various embodiments, a system may be provided in which the camera has a processor and is configured in a manner such that it analyses determined colour values by employing the processor.

In various embodiments, a system may be provided in which the camera, the processor, the input device and the output device are provided in a smartphone or tablet, and wherein the smartphone or the tablet analyses the colour values determined by the processor.

In various embodiments, a system may be provided in which the system for analysing the colour values determined by the system transmits the determined colour values to an external platform.

In various embodiments, a system may be provided in which the input device is provided as a keyboard and/or as a touch-sensitive screen of the smartphone or of the tablet, and in which at least one target hair colour value may be selected by employing the input device.

In various embodiments, a system may be provided in which the output device displays the information regarding at least one hair colour value in written and/or graphical format.

In various embodiments, a system may be provided in which the output device displays target hair colour values from a plurality of selectable stored target hair colour values.

In various embodiments, a system may be provided in which the output device displays a result of a colour balance of a determined actual hair colour value with a target hair colour value selected by employing the input device as x % colour match or as x % colour harmony.

In various embodiments, a system may be provided in which the output device displays further information to the user as regards a product recommendation, preferably as regards a hair colouring agent, a hair treatment recommendation, preferably as regards a treatment time for a hair colour composition, a mixing ratio for colour and developer to obtain the desired target colour value, or a care treatment, a recommendation for the selection of a shade of decorative cosmetics as well as a recommendation for the selection of a piece of jewelry and/or clothing.

The embodiments described above and the advantages mentioned are with respect to the described method, the calibration device and the system.

Although the method is illustrated herein with the aid of a single digital image, clearly, the method may be used for a plurality of images, for example a sequence of digital images, for example a video.

In this regard, the orientational terminology such as "top", "bottom", "front" "rear", "forward", "rearward" etc. are used with reference to the orientation of the described figure(s). Because components of embodiments can be positioned in a number of different orientations, the orientational terminology serves for illustration purposes and is not limiting in any way. It should be understood that other embodiments may be used and structural or logical modifications may be undertaken without deviating from the scope of protection of the present disclosure.

Furthermore, it is clear that the features of the various exemplary embodiments may be combined with each other, unless specifically stated to the contrary.

The following detailed description should therefore not be construed as being limiting, and the scope of protection of the present disclosure is defined in the accompanying claims.

FIG. 1 shows a diagrammatic flow chart 100 of a method for calibrating a camera in accordance with various exemplary embodiments.

The method may comprise: recording a digital image of at least one piece of calibration information on at least one fibre from a plurality of fibres from natural hair or fibres resembling natural hair by employing a camera (in 110), identifying the at least one fibre in the digital image by employing at least one marker (in 120), determining a plurality of colour values from a plurality of reference colours as the calibration information on the at least one fibre in the digital image, wherein a reference colour value is assigned to each reference colour (in 130), and assigning the respective determined colour value for the plurality of the determined colour values to the respectively assigned reference colour value for the plurality of reference colour values (in 140).

Figure 2:
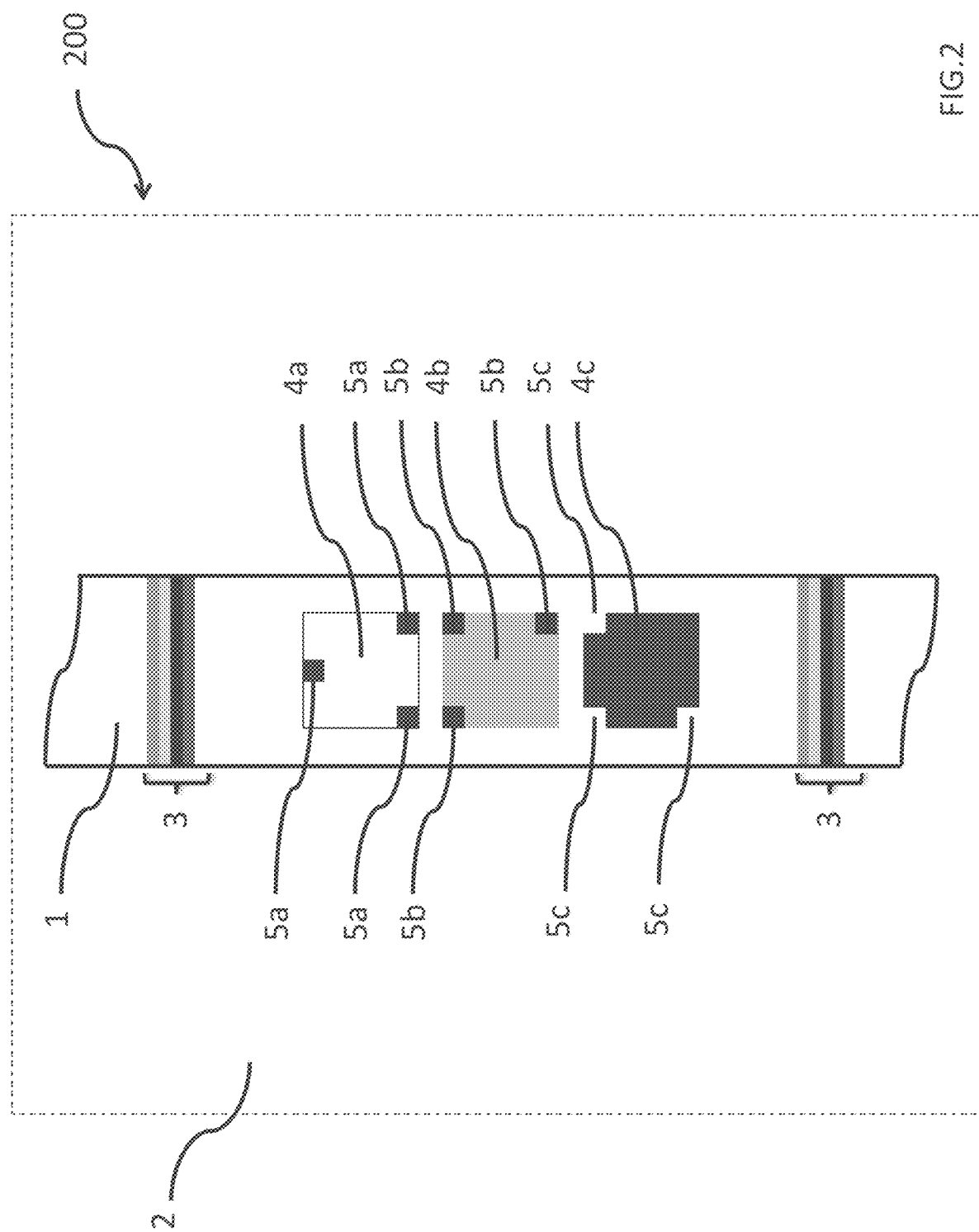
FIG. 2 shows a diagrammatic representation of a calibration features for calibrating a camera in accordance with various exemplary embodiments.

In various embodiments, the described method may be carried out to calibrate a camera using a calibration device, for example a calibration device as described in relation to FIG. 2.

FIG. 2 shows a diagrammatic representation 200 of a calibration device 1 in accordance with various exemplary embodiments.

A digital image 2 of the calibration device 1 may be recorded by employing a digital camera. The calibration device 1 here is illustrated in the form of a fibre. The fibre may be formed from natural hair, or may comprise a material that is similar to hair. The calibration device 1 may comprise a plurality of fibres, for example may include several fibres, and/or be a strand, in particular a strand of hair.

For the purposes of illustration, two markers 3 are provided on the calibration device 1. The two markers 3 comprise an unnatural colour profile within the calibration device 1. By employing the unnatural colour profile, the calibration device 1 can be localized on the digital image 2 by employing an image analysis method. A region on the calibration device 1 is provided between the two markers 3 which comprises information regarding three reference colours 4a, 4b, 4c.

The calibration device 1 furthermore comprises the markers 5a, 5b, 5c which are attached to the calibration device 1. Furthermore, the markers 5a, 5b, 5c are each disposed around a region in the digital image which comprises a reference colour 4a, 4b, 4c.

The markers 3, 5a, 5b, 5c, are suitable for being automatically identified in the digital image 2, for example by employing software. The markers 3, 5a, 5b, 5c, comprise, for example, a contrast-rich structure and/or prominent corners.

In this manner, a plurality of markers 5a, 5b, 5c, for example three colour regions 4a, 4b, 4c, can mark where the reference colours are positioned in the digital image 2.

The forms shown in FIG. 2 of the markers 3, 5a, 5b, 5c, are shown solely by way of example and clearly, any form may be used for the markers 3, 5a, 5b, 5c, or positional references may be used.

The markers 5a, 5b, 5c which may be used to determine a position and/or an orientation of a reference colour region in the digital image 2 may be positioned in different manners. As an example, and as illustrated in FIG. 2, for example, they may be provided at an edge region of the reference colour field so that at least one reference colour 4a or 4b or 4c is disposed between the markers 5a (shown in FIG. 2 as a white region) or 5b (shown in FIG. 2 as a grey region) or 5c (shown in FIG. 2 as a black region).

Furthermore, in order to differentiate between a plurality of reference colours 4a, 4b, 4c, the markers 5a, 5b, 5c may be disposed at different positions of the reference colour field, as can be seen in FIG. 2.

By employing an image analysis of the digital image 2 recorded by the camera, firstly, the calibration device 1 is detected by employing the at least one marker 3 in the digital image. This is also possible when the markers are invisible to the human eye.

If the markers 3 are visible to the human eye, then the camera can be manually positioned over the calibration device.

If the position of the calibration device 1 in the digital image 2 has been determined, then, for example, the position and colour value of the reference colours 4a, 4b, 4c may be determined in a region between the 3 markers. In this manner, a disposition of the marker 5a in the digital image is determined. As an example, the marker 5a in FIG. 2 may be disposed around a first reference colour 4a in a manner such that a marker 5a is provided in the upper middle and down below, two markers 5a are provided respectively in the corners.

In order to determine the position of the central reference colour 4b in the digital image, an orientation of the marker 5b is searched for, for example, wherein two markers 5b are positioned at the upper corners and a marker 5b is positioned in the lower right hand corner. If, for example, a third position of a third reference colour 4c is to be determined, this can be carried out by orientating the marker 5c in the digital image in which, for example, two markers 5c are positioned in the upper corners and one marker 5c is positioned in the lower left hand corner.

The markers 5a, 5b, 5c may differ in form, so that a precise detection of the respective markers 5a, 5b, 5c may be carried out.

The at least one marker 3 may, for example, be extensive and rectangular, as illustrated in FIG. 2. In various exemplary embodiments, square or round surfaces for the marker 3 may be employed. Furthermore, in various exemplary embodiments, the at least one marker 3 may run once around the calibration device 1.

The at least one reference colour 4a, 4b, 4c may be square, as illustrated in FIG. 2, but may also be circular or rectangular or in any other form. The reference colours 4a, 4b, 4c may also be provided in a manner such that the at least one reference colour region is interrupted or uninterrupted or runs continuously around the calibration device 1.

In order to assign the respective reference colour values to the respective reference colour 4a, 4b, 4c, information may be provided, for example by employing a barcode, a QR code or another coding and decoding method.

In accordance with various embodiments, the at least one marker 3 may be disposed on the calibration device 1 in a manner such that, by employing an image analysis, the at least one fibre, for example, can be distinguished from other objects in the digital image. In FIG. 2, the at least one marker 3 is provided by employing four different colour fields. However, the present disclosure is not limited to this. In various exemplary embodiments, any number of colour fields may be used.

In various exemplary embodiments, the known position of at least one marker 3, 5a, 5b, 5c, may be exploited in order to detect objects, for example a calibration device 1 or colour information regions on the calibration device 1 in the digital image, in a computer-aided manner, for example by employing an image recognition method or by employing image recognition software.

Figures 1, 3:
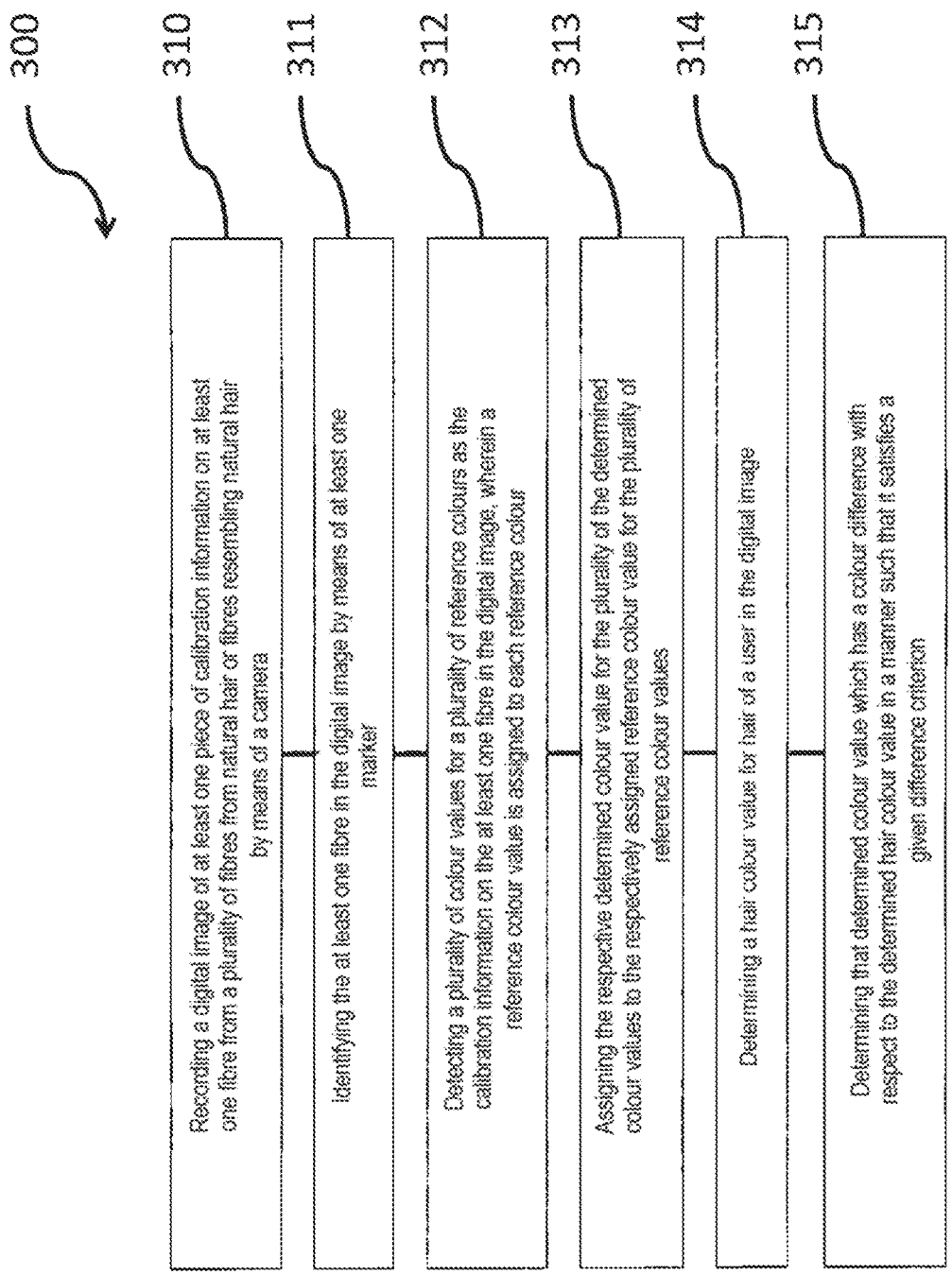
Figures 2, 3:
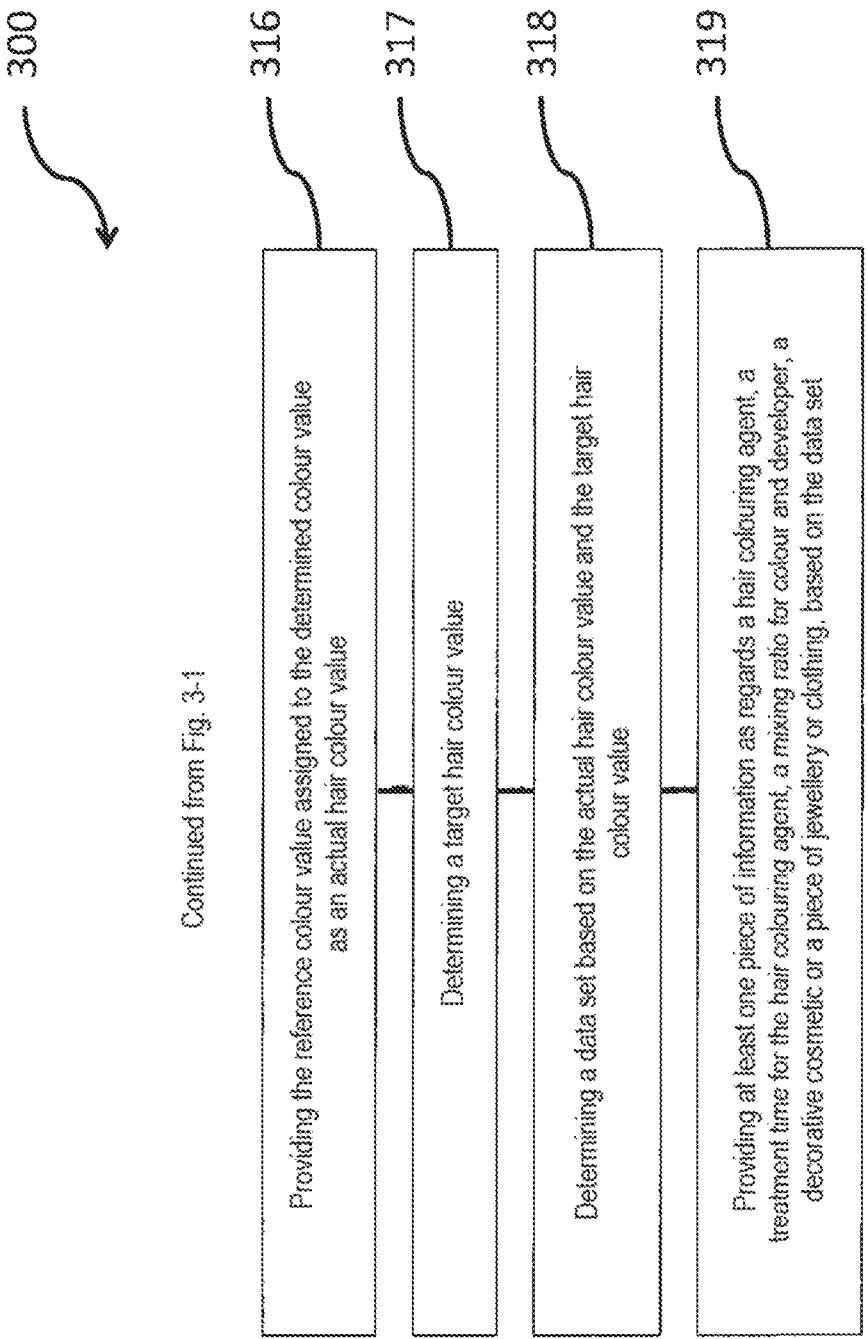

FIGS. 3-1 to 3-2 show a diagrammatic flow chart of a method for detecting user-specific hair colour information in accordance with various exemplary embodiments. The method comprises the steps of the method shown in the flow chart illustrated in FIG. 1. The steps 310 to 313 may correspond to the steps 110 to 140. The method may comprise: recording a digital image of at least one piece of calibration information on at least one fibre from a plurality of fibres from natural hair or fibres resembling natural hair by employing a camera (in 310), identifying the at least one fibre in the digital image by employing at least one marker (in 311), detecting a plurality of colour values for a plurality of reference colours as the calibration information on the at least one fibre in the digital image, wherein a reference colour value is assigned to each reference colour (in 312), and assigning the respective determined colour value for the plurality of the determined colour values to the respectively assigned reference colour value for the plurality of reference colour values (in 313), determining a hair colour value for hair of a user in the digital image (in 314), determining that determined colour value which has a colour difference with respect to the determined hair colour value in a manner such that it satisfies a given difference criterion (in 315), providing the reference colour value assigned to the determined colour value as an actual hair colour value (in 316), determining a target hair colour value (in 317), determining a data set based on the actual hair colour value and the target hair colour value (in 318), providing at least one piece of information, for example as regards a hair colouring agent, a treatment time for the hair colouring agent, a mixing ratio for colour and developer, a decorative cosmetic or a piece of jewelry or clothing, based on the data set (in 319).

Figure 4:
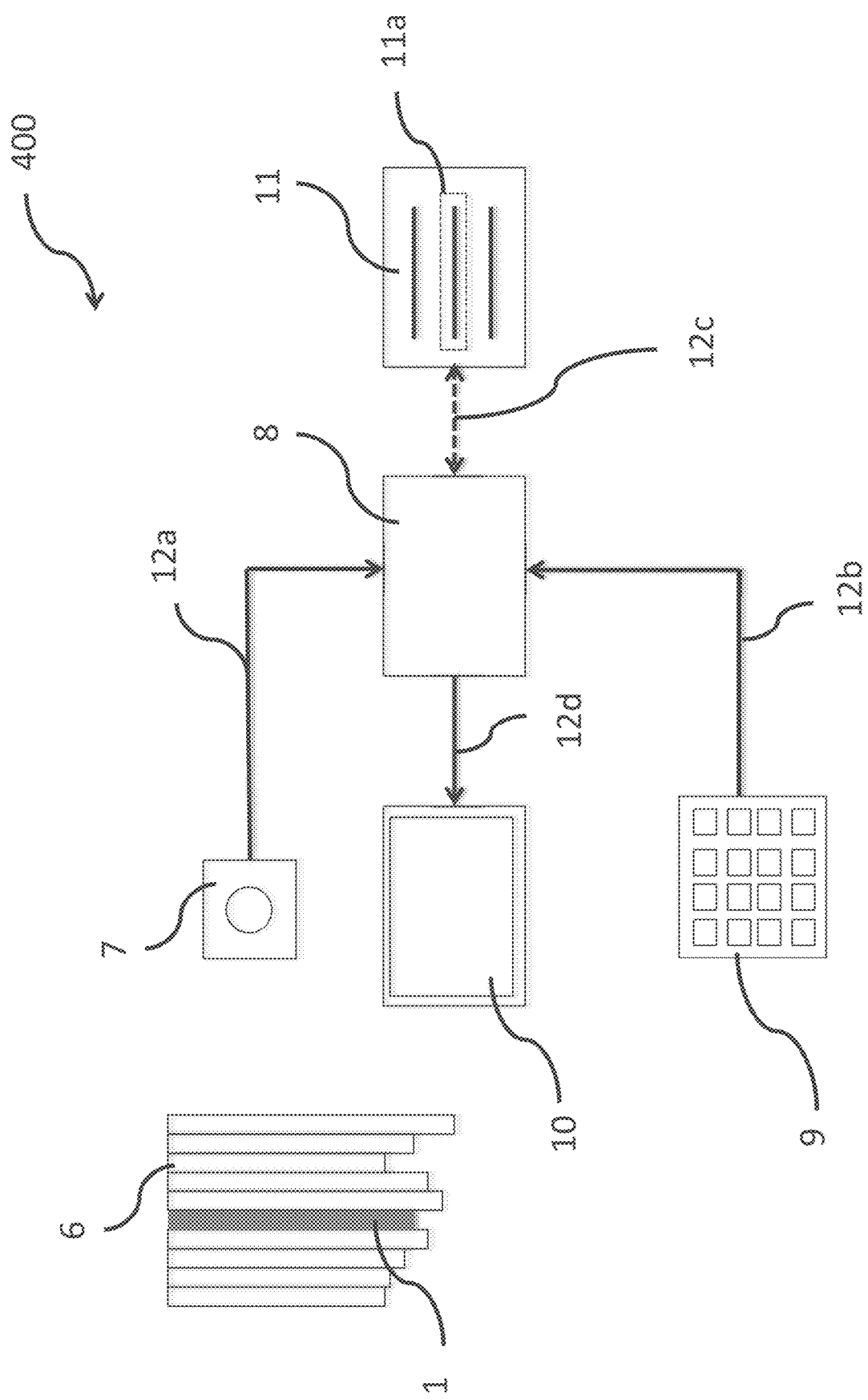
FIG. 4 shows a diagrammatic representation of a system for determining hair information in accordance with various exemplary embodiments.

FIG. 4 shows a diagrammatic representation 400 of a system for computer-aided determination of hair colour information in accordance with various exemplary embodiments. In accordance with various exemplary embodiments, the system may comprise a calibration device 1. In FIG. 4, the calibration device 1 is illustrated in the form of a fibre in a region of natural hair 6 of a user. The calibration device 1 may be recorded with the camera 7. In this regard, the calibration device 1 may on the one hand be recorded alone with the camera and in a further step, the hair 6 of the user can be recorded with the camera.

As an alternative, the calibration device may be recorded in one digital image together with the hair 6 of the user using the camera 7. In this regard, either a digital image or several digital images may be recorded with the camera 7.

The camera 7 can transfer the digital information to a processor 8 to analyse the at least one digital image via a line 12a. By employing the processor 8 and image analysis software or an algorithm or a program, the calibration device 1 in the at least one digital image can be identified. As an example, the calibration device may be identified with the aid of at least one marker. The reference colours on the calibration device 1 may be identified by employing further markers. The processor 8 assigns the colour values for the detected reference colours to the respective associated reference colour values.

By employing the input device 9, the user can select a target hair colour value, wherein possible target hair colour values can be presented to the user by employing the output device 10.

The output device 10 may be a screen, for example what is known as an OLED screen. This should be understood to mean a screen which uses a plurality of organic light emitting diodes to display an image. The screen may be a screen of a smartphone or a tablet. The screen may have a touch-sensitive screen. The screen may be a touch screen.

The processor 8 is provided with the information regarding the target hair colour value selected by the user by employing the line 12b. Starting from the determined hair colour value for the user and the target hair colour value determined with the input device 9, by employing the processor 8, a matching data set 11a on an external platform 11, for example a database, can be determined by employing a connection 12c. The connection 12c may be hard-wired or wireless, for example a data connection using radio, WLAN or using a GSM network (global system for mobile communications).

The data set 11a holds, for example, information regarding a hair colouring agent, a hair care agent, a treatment time for the hair colouring agent, a mixing ratio for colour and developer, a decorative cosmetic or a piece of jewelry or clothing suitable for the user.

The respective data set 11a is supplied to the processor 8. The processor 8 then transfers the prepared information based on the respective data set to the output device 10 via the line 12d.

The user is presented with written and/or graphic user-based information by employing the output device 10, for example a screen. In this manner, the user can be presented, for example, with information regarding a degree of damage to their hair, a care agent that is tailored to it, a result of a colour balance of the actual hair shade with a target hair shade as x % colour match or as x % colour harmony, a treatment time for a colouring agent, a mixing ratio for colour and developer, a selection of a shade for a decorative cosmetic, a selection of shades for jewelry and/or clothing.

The external platform 11 may also be provided in order to store colour values determined using the system and to provide it to a plurality of users.

The camera 7 may, in various embodiments, be configured in a manner such that it can record a digital image 2 of a calibration device 1, of hair 6 of a user and of additional objects. As an example, the additional objects may be a face and/or a part of the user's body and/or pieces of clothing.

A region of the digital image 2 in which the calibration device 1 is depicted may be described as the calibration device region. To express it a different way, the calibration device 1 and other objects such as, for example, the hair 6 of a user and regions of the head of the user such as skin, for example, may be depicted in the digital image 2.

A region of the digital image in which the hair of the user is depicted may be described as the hair region area. To express it a different way, the camera 7 may be configured in a manner such that it records a digital image 2 of the hair 6 of the user and the surroundings of the hair 6 of the user in a manner such that in the digital image 2, at least a portion of the hair 6 of the user is depicted. In various exemplary embodiments, only the calibration device 1 or hair 6 of the user or a background region etc. may be depicted in the digital image 2.

In accordance with various exemplary embodiments, the at least one camera 7 may comprise a stills camera or a video camera, i.e. a camera which may be configured so as to record a plurality of individual images in sequence. On the other hand, the at least one camera 7 may comprise a stills camera to record individual images.

In various exemplary embodiments, the camera 7 may be a camera of a smartphone, a tablet or a webcam. In various exemplary embodiments, the camera 7 may be provided in the smartphone or tablet.

The camera may be a high resolution digital camera (HD camera or high definition camera). The camera may be an ultra HD camera and have a resolution of 4K (4096×2160). Furthermore, the camera may have a resolution of 8K (7680×4320). In particular, the camera may be provided to record small structures at a high resolution.

In order to calibrate the camera, furthermore, a white balance may be carried out. A white balance map used for the white balance, for example a grey map, may be provided as an additional reference colour on the calibration device. Prior to carrying out the colour calibration for the camera, in accordance with various embodiments, a white balance calibration of the camera may be carried out first. The white balance may be provided in order to sensitize the camera 7 to the colour temperature of the light at the recording location. The digital recording of images enables the colour temperature to be adapted to the lighting conditions at the recording location. A camera processor can then determine the correct colour temperature.

In various embodiments, the described system for computer-aided determination of hair information can carry out the described method for computer-aided determination of hair information in accordance with various embodiments, for example the method as described in connection with FIGS. 3-1 and 3-2.

Various aspects of this disclosure will now be illustrated below:

Exemplary embodiment 1 is a method for calibrating a camera. The method may comprise recording a digital image of at least one piece of calibration information on at least one fibre from a plurality of fibres from natural hair or fibres that resemble natural hair by employing a camera, identifying the at least one fibre in the digital image by employing at least one marker, determining a plurality of colour values for a plurality of reference colours as the calibration information on the at least one fibre in the digital image, wherein a reference colour value is assigned to each reference colour, and assigning the respective determined colour value for the plurality of the determined colour values to the respectively assigned reference colour value for the plurality of reference colour values.

In exemplary embodiment 2, the subject matter of exemplary embodiment 1 may optionally include the fact that the identification of the at least one fibre in the digital image by employing at least one marker comprises an identification of an unnatural colour profile within the at least one fibre and/or of a characteristic shade on the at least one fibre in the digital image.

In exemplary embodiment 3, the subject matter of the exemplary embodiments 1 or 2 may optionally include the fact that the determination of the plurality of colour values in the digital image comprises identifying a plurality of reference regions in which the reference colours are provided, by employing at least one further marker.

In exemplary embodiment 4, the subject matter of the exemplary embodiments 1 to 3 may optionally include the fact that when identifying the at least one fibre in the digital image and/or when determining a plurality of colour values for a plurality of reference colours, markers with colour values are used which have a colour spectrum in a wavelength range of from about 10 nanometres to about 1 millimetre, preferably in a wavelength range of from about 380 nanometres to about 780 nanometres, or preferably in a wavelength range of from about 10 nanometres to about 380 nanometres or in a wavelength range of from about 780 nanometres to about 1 millimetre.

In exemplary embodiment 5, the subject matter of the exemplary embodiments 1 to 4 may optionally include the fact that the detection of the at least one marker is carried out by employing at least one optical method.

In exemplary embodiment 6, the subject matter of the exemplary embodiments 1 to 5 may optionally include the fact that the assignment of the plurality of colour values determined in the digital image to the reference colour values comprises storing the determined colour values for the associated reference colour values in a memory.

In exemplary embodiment 7, the subject matter of the exemplary embodiments 1 to 6 may optionally include the fact that the reference colours in the digital image are determined on the basis of a different colour stimulus specification and/or a different spectral composition and/or a different brightness.

In exemplary embodiment 8, the subject matter of the exemplary embodiments 1 to 7 may optionally include the fact that recording a digital image of at least one piece of calibration information may comprise recording a fibre which is semi-permanently coupled to the hair of a user in the form of a hair extension or in the form of a weave of the fibre into the hair of the user.

In exemplary embodiment 9, the subject matter of the exemplary embodiments 1 to 8 may optionally include the fact that recording of a digital image of at least one piece of calibration information comprises recording a fibre which is permanently coupled to the scalp of the user by employing implantation.

In exemplary embodiment 10, the subject matter of the exemplary embodiments 1 to 9 may optionally include the fact that recording a digital image of at least one piece of calibration information is carried out by employing a camera of a smartphone or a tablet.

In exemplary embodiment 11, the subject matter of the exemplary embodiments 1 to 10 may optionally include the fact that the fact that the calibration information, preferably the reference colours, are provided in a manner such that they can be matched to a starting shade of the hair of the user.

Exemplary embodiment 12 is a method for the computer-aided determination of hair colour information. The method may comprise carrying out a method for the calibration of a camera in accordance with one of the exemplary embodiments 1 to 11, and furthermore determining a hair colour value for hair of a user in the digital image, determining that determined colour value which has a difference in colour to the determined hair colour value such that it satisfies a predetermined difference criterion, providing the reference colour value assigned to the determined colour value as the actual hair colour value, determining a target hair colour value, determining a data set based on the actual hair colour value and on the target hair colour value, providing at least one piece of information which is relevant to the user, for example a product recommendation regarding a hair colouring ag, a hair treatment recommendation, preferably concerning the treatment time for a hair colouring agent, a mixing ratio for colour and developer or a conditioning treatment, or a colour recommendation, preferably as regards the selection of a decorative cosmetic or a piece of jewelry or clothing, based on the data set.

In exemplary embodiment 13, the subject matter of the exemplary embodiment 12 may optionally include the fact that the determination of a hair colour value comprises determining a hair colour value in a hair region area in the digital image.

In exemplary embodiment 14, the subject matter of the exemplary embodiments 12 or 13 may optionally include the fact that the determination of the target colour value comprises determining the target hair colour value using an input device, preferably by employing a keyboard or by employing a touch-sensitive screen of a smartphone or tablet.

In exemplary embodiment 15, the subject matter of the exemplary embodiments 12 to 14 may optionally include the fact that the determination of the target hair colour value comprises selecting the target hair colour value from a plurality of selectable stored target hair colour values.

In exemplary embodiment 16, the subject matter of the exemplary embodiments 12 to 15 may optionally include the fact that the determination of a data set based on the actual hair colour value and on the target hair colour value is carried out using the camera, or the determination of a data set based on the actual hair colour value and on the target hair colour value is carried out by employing an external platform.

In exemplary embodiment 17, the subject matter of the exemplary embodiments 12 to 16 may optionally include the fact that the method is carried out using a mobile application.

In exemplary embodiment 18, the subject matter of the exemplary embodiments 12 to 17 may optionally include the fact that the provision of at least one piece of information comprises a written and/or graphical presentation on an output device, preferably a screen or a smartphone or a tablet.

In exemplary embodiment 19, the subject matter of the exemplary embodiments 12 to 18 may optionally include the fact that a result of a colour balance of the actual hair colour value with a target hair colour value selected by employing an input device is presented to the user by employing the output device as x % colour match or as x % colour harmony.

Exemplary embodiment 20 may include a calibration device for calibrating a camera. The method may comprise at least one fibre from a plurality of natural hair fibres or from fibres that are similar to natural hair, a plurality of different reference colour structures which are attached to the at least one fibre, and at least one marker to detect the at least one fibre in a digital image.

In exemplary embodiment 21, the subject matter of the exemplary embodiment 20 may optionally include the fact that the at least one marker comprises an unnatural colour profile or at least one characteristic shade.

In exemplary embodiment 22, the subject matter of the exemplary embodiment 20 or 21 may optionally include the fact that the at least one marker comprises colour values which lie in a colour spectrum in a wavelength range of from about 10 nanometres to about 1 millimetre, preferably in a wavelength range of from about 380 nanometres to about 780 nanometres, or preferably in a wavelength range of from about 10 nanometres to about 380 nanometres or in a wavelength range of from about 780 nanometres to about 1 millimetre.

In exemplary embodiment 23, the subject matter of the exemplary embodiments 20 to 22 may optionally include the fact that the calibration device comprises at least one further marker on the calibration device, wherein by employing the at least one further marker, at least one of the plurality of reference colour structures may be detected on the calibration device in a digital image.

In exemplary embodiment 24, the subject matter of the exemplary embodiments 20 to 23 may optionally include the fact that the plurality of reference colour structures differs in a colour stimulus specification and/or a spectral composition and/or a brightness.

In exemplary embodiment 25, the subject matter of the exemplary embodiments 20 to 24 may optionally include the fact that the reference colour structures may be matched to a starting colour value for hair of a user.

In exemplary embodiment 26, the subject matter of the exemplary embodiments 20 to 25 may optionally include the fact that the calibration device is semi-permanently provided as a hair extension or by employing weaving the calibration device into the hair of a user, or is permanently provided by implantation of the calibration device into the scalp of the user.

Exemplary embodiment 27 may be a system for computer-aided determination of hair colour information. The method may comprise the calibration device in accordance with one of the exemplary embodiments 20 to 26, a camera to record a digital image of the calibration device and/or of hair of a user; a processor to identify the calibration device and/or colour values in the digital image, an input device to select a target hair colour value, and an output device for providing information regarding at least one hair colour value.

In exemplary embodiment 28, the subject matter of exemplary embodiment 27 may optionally include the fact that the camera is a colour camera of a smartphone or a tablet.

In exemplary embodiment 29, the subject matter of exemplary embodiment 27 or 28 may optionally include the fact that the camera has a processor and is configured in a manner such that it analyses determined colour values by employing the processor.

In exemplary embodiment 30, the subject matter of exemplary embodiments 27 to 29 may optionally include the fact that the camera, the processor, the input device and the output device are provided in a smartphone or tablet, and wherein the smartphone or the tablet analyses the colour values determined by the processor.

In exemplary embodiment 31, the subject matter of exemplary embodiments 27 to 30 may optionally include the fact that the system for analysing the colour values determined by the system transmits the determined colour values to an external platform.

In exemplary embodiment 32, the subject matter of exemplary embodiments 27 to 31 may optionally include the fact that the input device is provided as a keyboard and/or as a touch-sensitive screen of the smartphone or of the tablet, and in which at least one target hair colour value may be selected by employing the input device.

In exemplary embodiment 33, the subject matter of exemplary embodiments 27 to 32 may optionally include the fact that the output device displays the information regarding at least one hair colour value in written and/or graphical format.

In exemplary embodiment 34, the subject matter of exemplary embodiments 27 to 33 may optionally include the fact that the output device displays target hair colour values from a plurality of selectable stored target hair colour values.

In exemplary embodiment 35, the subject matter of exemplary embodiments 27 to 34 may optionally include the fact that the output device displays a result of a colour balance of a determined actual hair colour value with a target hair colour value selected by employing the input device as x % colour match or as x % colour harmony.

In exemplary embodiment 36, the subject matter of exemplary embodiments 27 to 35 may optionally include the fact that the output device displays further information to the user as regards a product recommendation, preferably as regards a hair colouring agent, a hair treatment recommendation, preferably as regards a treatment time for a hair colour composition, a mixing ratio for colour and developer, or a care treatment or a colour recommendation, preferably regarding the selection of a decorative cosmetic or a piece of jewelry and/or clothing.

Further advantageous embodiments of the method will become apparent from the description of the calibration device and of the system, and vice versa.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method for calibrating a camera, comprising:
recording a digital image, by a camera, of hair of a user and at least one calibration fibre having a first marker of an unnatural color, a second marker of the unnatural color and a region between the first marker and the second marker, wherein the region includes a first known reference colour value, a second known reference color value, and a third known reference colour value;
identifying the calibration fibre in the digital image by detecting the first marker and the second marker;
determining a hair colour value for hair of the user in the digital image by determining a difference in colour between the first known reference colour value, the second known reference color value, the third known reference colour value and the hair of the user;
determining a target hair colour value;
determining a data set based on the hair colour value and on the target hair colour value; and
providing an information which is relevant to the user based on the data set.

2. The method as claimed in claim 1, wherein identifying the calibration fibre in the digital image includes identifying an unnatural colour profile within at least one of the first marker and the second marker in the digital image.

3. The method as claimed in claim 1, further comprising identifying the region in which the first reference colour value, the second reference colour value, and the third reference colour value are provided, determining a plurality of colour value for each of the first reference color value, the second reference colour value and the third reference colour value on the calibration fibre in the digital image, by employing at least one further marker.

4. The method as claimed in claim 1, wherein, when identifying the calibration fibre in the digital image, the first marker and the second marker include colour values having a colour spectrum in a wavelength range of from 10 nanometres to 1 millimetre.

5. The method as claimed in claim 1, wherein identifying the first marker and the second marker is carried out by employing at least one optical method.

6. The method as claimed in claim 1, further comprising determining a plurality of colour values for a plurality of reference colours as the calibration information on the calibration fibre in the digital image, wherein a reference colour value is assigned to each reference colour and storing the determined colour values for the associated reference colour values in a memory.

7. The method as claimed in claim 1, wherein the first known reference colour in the digital image is determined on the basis of at least one of a different colour stimulus specification and a different spectral composition and a different brightness.

8. The method as claimed in claim 1, wherein recording the digital image includes recording the calibration fibre which is semi-permanently coupled to the hair of a user in the form of a hair extension or in the form of a weave of the fibre into the hair of the user.

9. The method as claimed in claim 1, wherein recording the digital image includes recording the calibration fibre which is permanently coupled to a scalp of the user by means of implantation.

10. The method as claimed in claim 1, wherein the calibration fibre is provided in a manner such that it is matched to the starting shade of the hair of the user.

11. The method as claimed in claim 1, wherein the information which is relevant to the user includes comprises a product recommendation, a hair treatment recommendation, a mixing ratio for colour and developer or a conditioning treatment, or a colour recommendation.

12. The method as claimed in claim 1, wherein determining the data set based on the actual hair colour value and on the target hair colour value is carried out using the camera, or wherein determining the data set based on the actual hair colour value and on the target hair colour value is carried out by employing an external platform.

\* \* \* \* \*